Nov. 13, 1962 J. G. BAUMGARTNER 3,063,204
BRISTLE GRINDING
Filed Aug. 18, 1959 6 Sheets-Sheet 1

INVENTOR.
John G. Baumgartner
BY Mueller & Aichele
Attys

Nov. 13, 1962  J. G. BAUMGARTNER  3,063,204
BRISTLE GRINDING
Filed Aug. 18, 1959  6 Sheets-Sheet 2

Inventor
John G. Baumgartner
By: Mueller & Aichele
Attys.

Nov. 13, 1962  J. G. BAUMGARTNER  3,063,204
BRISTLE GRINDING
Filed Aug. 18, 1959  6 Sheets-Sheet 3

Inventor:
John G. Baumgartner
By Mueller & Aickele
Attys.

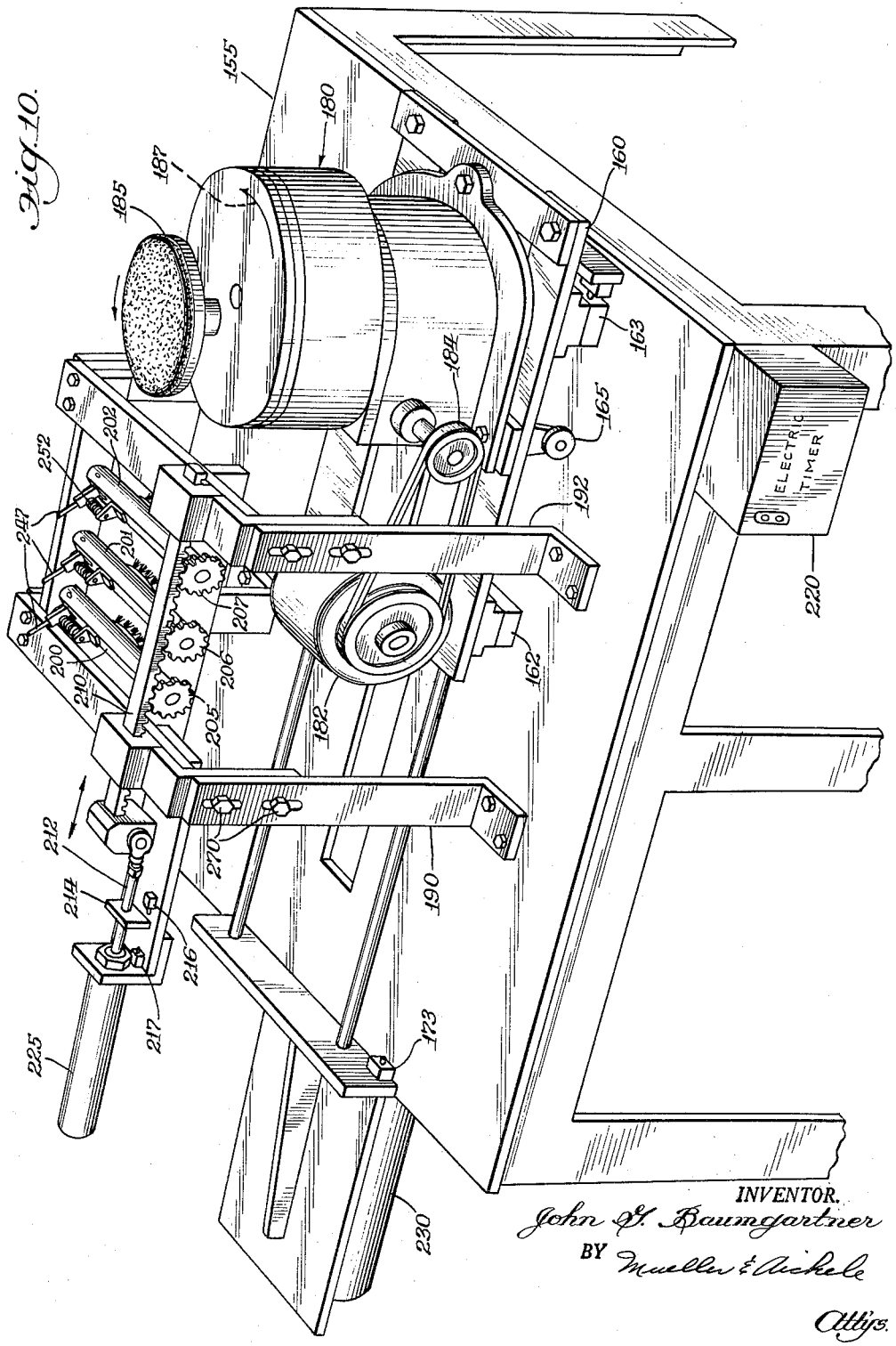

Nov. 13, 1962   J. G. BAUMGARTNER   3,063,204
BRISTLE GRINDING
Filed Aug. 18, 1959   6 Sheets-Sheet 5
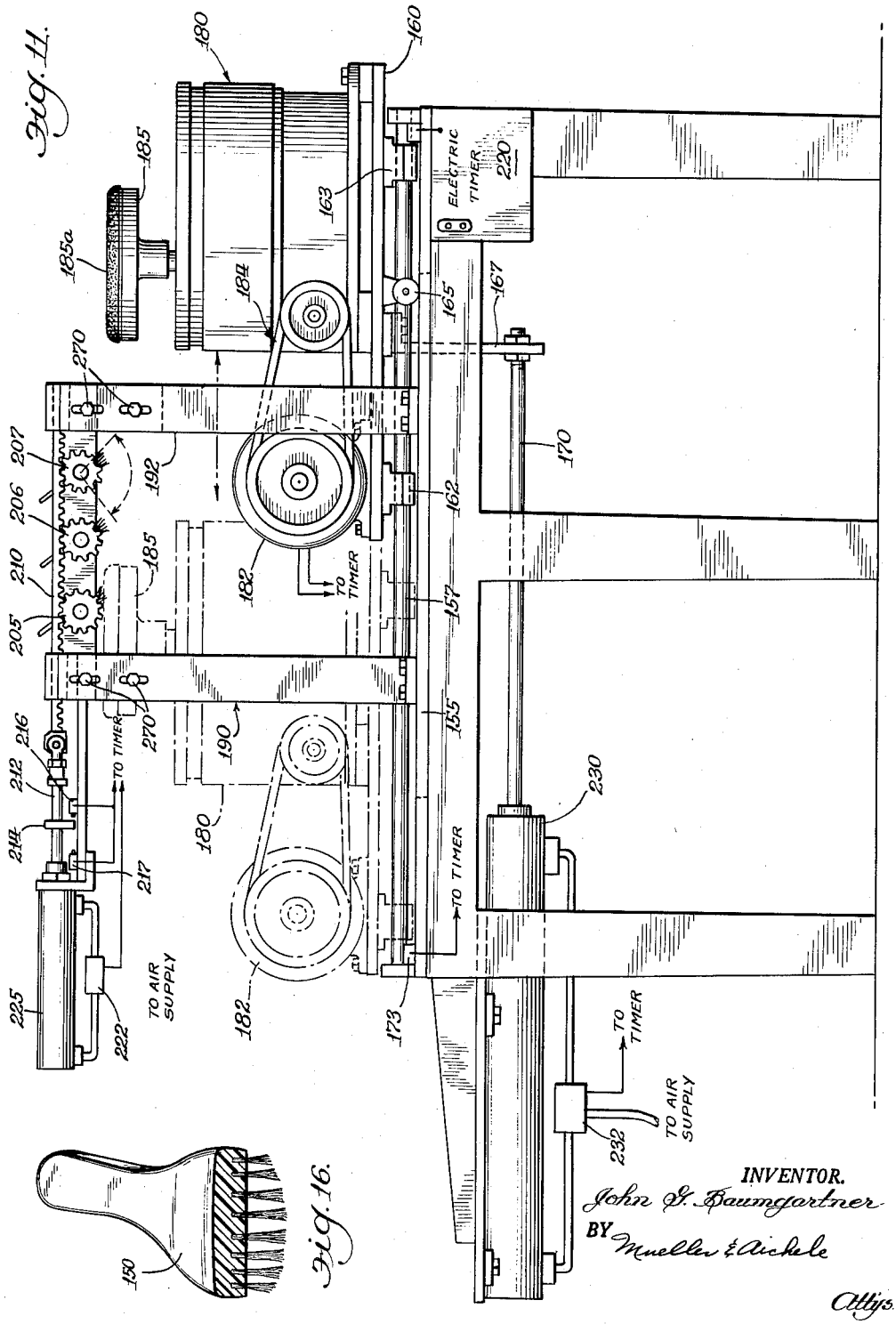
INVENTOR.
John G. Baumgartner
BY Mueller & Aichele
Attys.

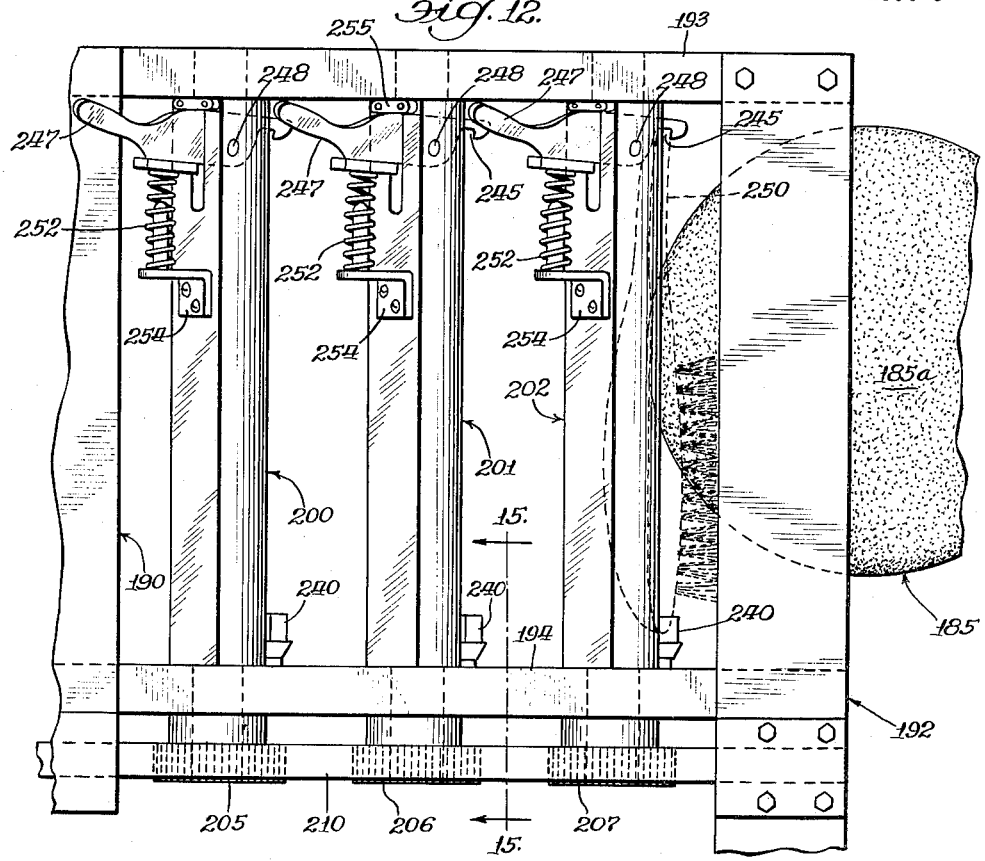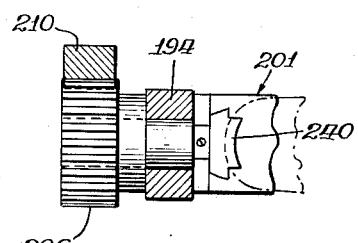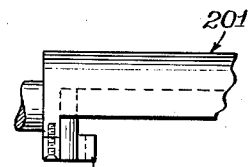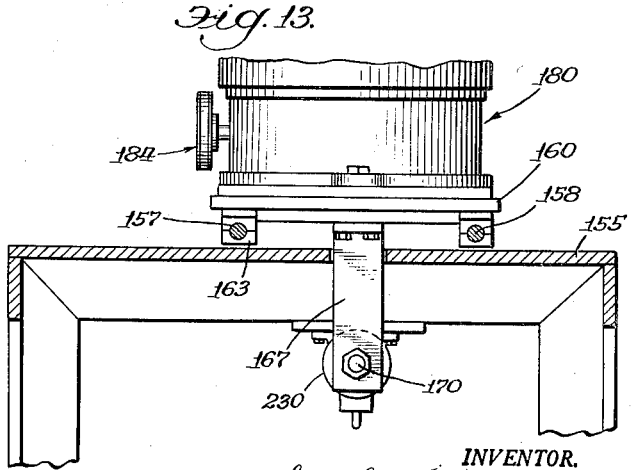

United States Patent Office 3,063,204
Patented Nov. 13, 1962

3,063,204
BRISTLE GRINDING
John G. Baumgartner, Aurora, Ill.
Filed Aug. 18, 1959, Ser. No. 834,600
13 Claims. (Cl. 51—119)

This invention relates to the brush making art and more particularly to apparatus and a method for grinding the ends of brush bristles so that they have a tapered and rounded configuration.

Many of the brushes manufactured by present-day methods have bristles the ends of which are sharp and jagged. This is particularly true of brushes having relatively stiff, thermoplastic bristles such as toothbrushes and hairbrushes. In useing these, there is the danger of discomfort or even injury to a person applying such bristles to the skin. The undesirable bristle configuration can occur, for example, in the trimming operation after the bristles have been set in the brush back or handle. Since this type of trimming is to form the bristles and tufts to the proper length, the cut is made transverse to the bristle and thus sharp corners are formed at the free ends thereof. Such trimming generally must be done with the stiff, tough bristles between two scissor-type blades and this can also result in a sharp burr or mushrooming effect at the ends of the bristles, thus producing harmful sharp projections from the bristle ends.

A further undesirable characteristic of brushes having thermoplastic bristles has been the glass-like or polished surfaces of the bristles. When these bristles are used in personal brushes, a smooth surface tends to reduce greatly a desirable stimulation effect on the skin of a user of the brush. In the case of toothbrushes, for example, a glass-like surface of the bristles would impair the ability of the bristles to massage the gums, as has been recommended to improve the circulation and harden the gum tissue. Obviously the scouring action of the bristles would also be less effective since there would be a relatively ineffectual frictional surface of the bristles. The previously mentioned sharp burrs, or corners, of the bristles are not to be confused with what may be termed a desirable overall roughening of the end sections of the bristles, since the former is formed by a very sharp corner or edge at the end of the bristle and the latter is associated with the surface area of the entire end section of a bristle and, of course, refers to a roughening of the type which promotes friction but does not provide harmful cutting action.

Brushes of various types are further often used in the application of liquid, paste or powders and this is true of the hair brushes and toothbrushes already discussed. In the absence of the glass-like glossy surface at the ends of the bristles, the bristles would have an improved ability to retain materials of these types for application. That is, roughened bristle end sections which facilitate the above described massaging of the skin, will also provide greater adhesion for the various products which are so frequently applied or otherwise used with a brush.

It is an object of this invention to provide means and a method of making a brush having bristles which are rounded and tapered at the free ends thereof.

Another object is to provide means and a method of making improved brushes, such as toothbrushes and hairbrushes, having bristles with end sections that are slightly roughened, rather than glossy and polished, to facilitate the skin stimulation effect of the bristles and improve the ability of the bristles to retain material to be applied thereby.

Another object is to provide a machine for economically grinding the ends of thermoplastic brush bristles to produce a rounded and slightly roughened configuration thereof.

A further object is to provide a reliable bristle grinding machine which requires a minimum of manipulation and attention by an operator of the machine.

A still further object is to provide a method and apparatus for making in production quantities brushes which have a greatly improved bristle form.

A feature of the invention is the provision of a grinding member for brush bristles which member is rotatable at a relatively high grinding speed and simultaneously movable relatively slowly in an eccentric path for uniformly grinding bristle ends pressed thereagainst.

A further feature is the provision of such brush grinding apparatus which includes brush carrying means to retain a brush with the bristles flexed against a grinding member during a plurality of cycles of motion thereof, so that the bristle ends are effectively "rolled" by the grinding member for uniformly tapering and rounding the complete circumference of the bristle ends.

Another feature is the provision of brush bristle grinding apparatus having a plurality of rotatable grinding discs which are simultaneously rotated and moved in respective circular paths to form a pluraltiy of substantially parallel grinding surfaces and which apparatus includes brush conveying means for automatically pressing brush bristles sequentially against such grinding surfaces.

A further feature is the provision of brush bristle grinding apparatus employing a grinding member which is simultaneously rotated at a grinding speed and moved in an eccentric path and wherein the grinding member is also reciprocally moved with respect to the brushes which are supported in a holder, so that the bristles thereof are repeatedly flexed upon the grinding member and are uniformly rounded at the ends. The brush holder may also rotate the brushes so as to present to the grinding member all of the bristles of a brush having them set in a pattern in which the free ends are non-planar.

A still further feature is the method of bristle grinding to form tapered, slightly roughened, bristle ends which includes flexing a bristle against abrasive means and repeatedly moving the sets of bristles across the abrasive means as the same is driven to provide grinding action of the bristles and rolling action of the bristles thereby uniformly grinding the bristle ends and slightly roughening the end sections of the bristles.

Figure 1:
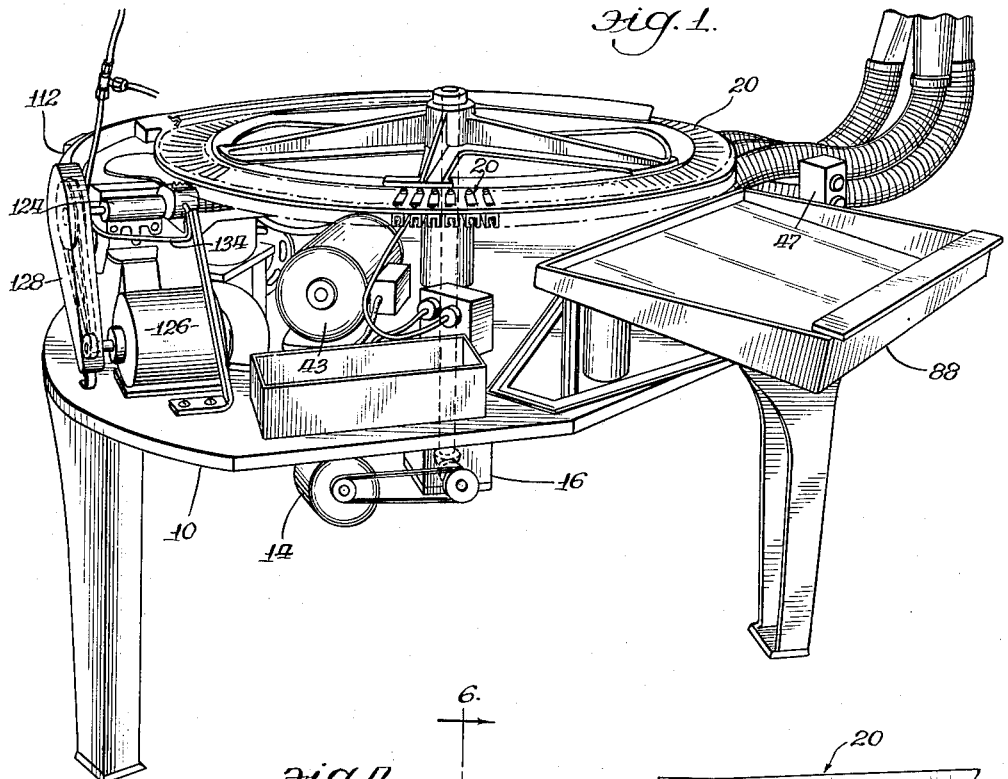
FIG. 1 is a perspective view of one form of brush grinding machine constructed in accordance with the invention.
Figure 4:
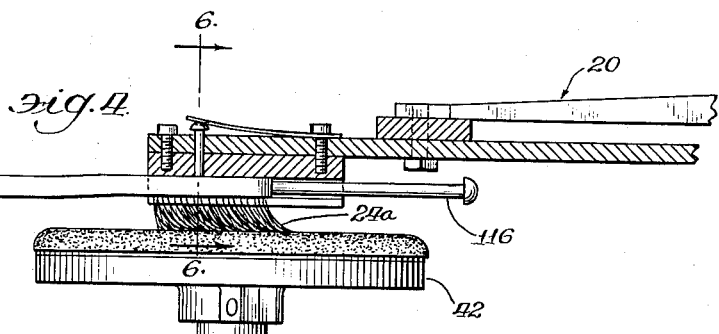
FIG. 4 is a sectional view along the line 4—4 of FIG. 2.
Figure 7:
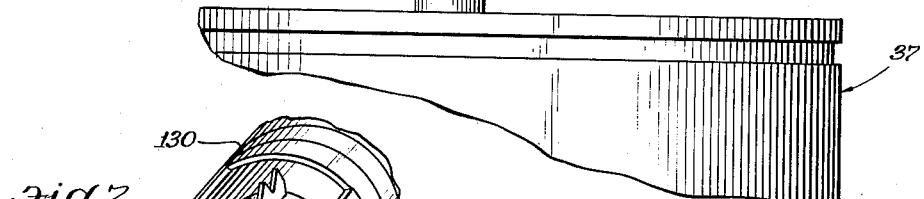
Figure 7:
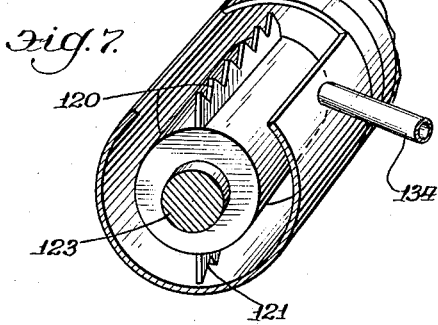
Figure 2:
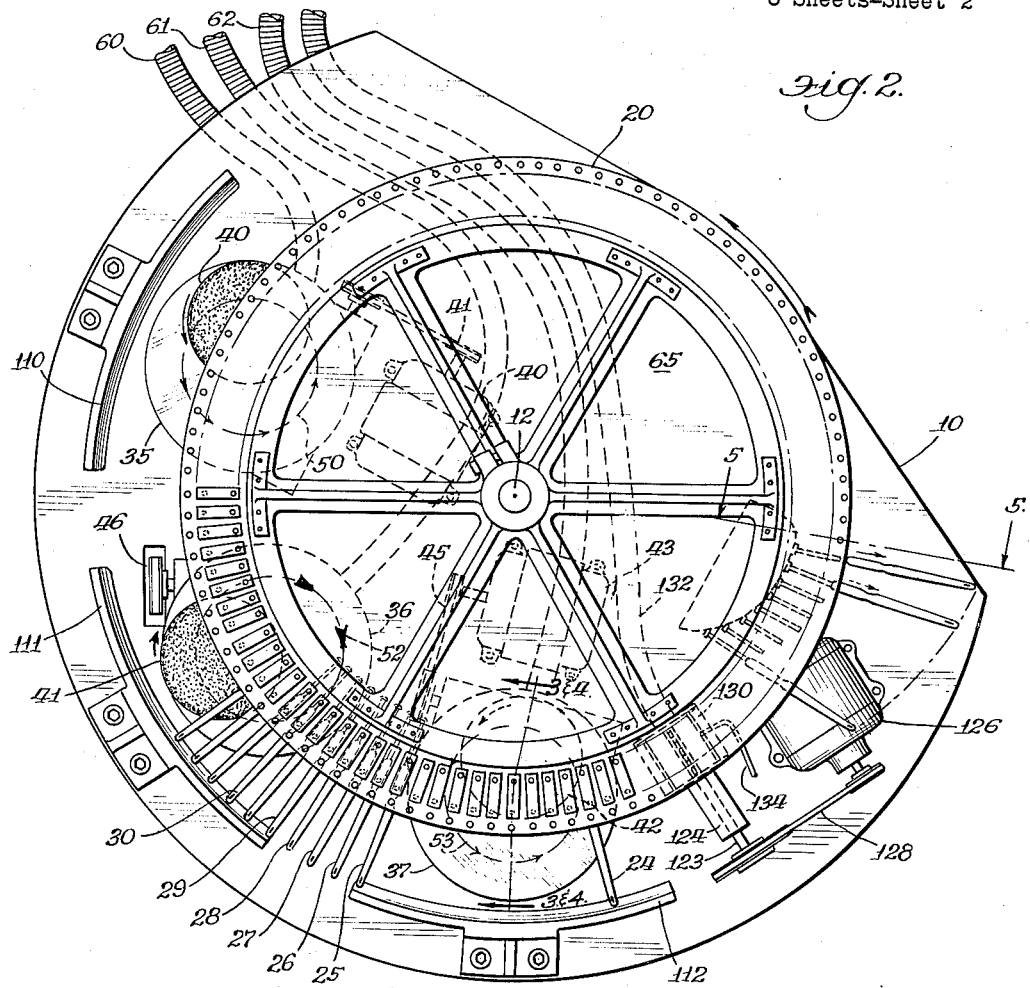
FIG. 2 is a plan view of the machine of FIG. 1.
Figure 5:
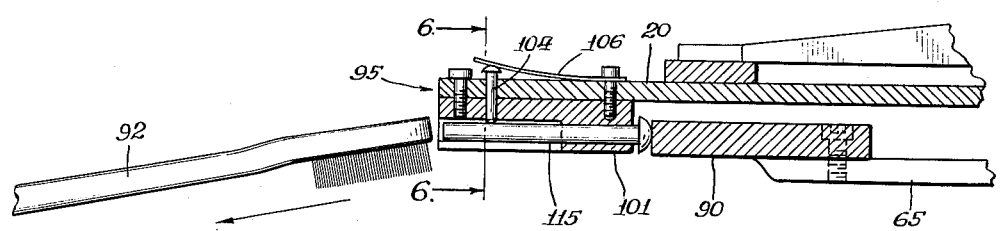
Figures 8, 9:
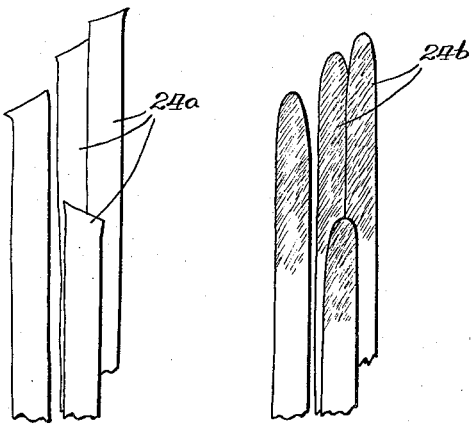
Figure 6:
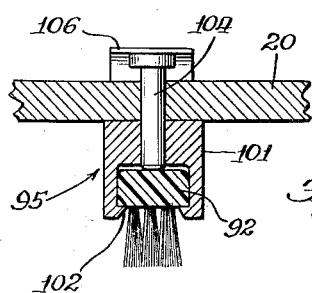

FIG. 4-a is a plan view of a brush engaged with an abrasive surface in the machine shown in FIG. 4;

FIG. 5 is a view along the line 5—5 of FIG. 2;

FIG. 6 is a sectional view along the line 6—6 of FIG. 4;

FIG. 7 is a partial perspective view of a bristle deflector of the machine of FIG. 1;

FIGS. 8 and 9 are greatly enlarged views of brush bristles respectively before and after treatment by the machine of FIG. 1;

FIG. 10 is a perspective view of another type of brush grinding machine constructed in accordance with the invention;

FIG. 11 is an elevational view of the machine of FIG. 10;

FIG. 12 is a partial plan view of the machine of FIG. 10;

FIG. 13 is a partial elevational view of the right end of the machine of FIG. 11;

FIGS. 14 and 15 are partial views of the machine as shown in FIG. 12; and

FIG. 16 is a view of a brush of the type which may be treated in the machine shown in FIGS. 10–15.

In brief, the invention includes bristle grinding means comprising a grinding member rotated at a relatively high or grinding speed and simultaneously driven in an eccentric path at a relatively low speed. The brush bristles are flexed or pressed against the grinding members so that the bristle ends are effectively rolled by the frictional engagement thereof upon the grinding member and by the eccentric movement of the grinding member thus presenting all portions of the bristle ends to be tapered and rounded.

In one particular form, which is especially adapted for treatment of toothbrushes, a holder for the brushes is constructed to transport the brushes from a feeding station, through the grinding operation and to an exit station. The apparatus would preferably include a plurality of grinding members as above described so that the brush bristles are ground by each of the different grinding members. These members may take the form of discs which rotate in different directions and have differing abrasive surfaces in order to obtain the most satisfactory final bristle end configuration.

In another form of the invention, the grinding member which is operative in accord with the above described compound motion, is automatically reciprocated to engage a plurality of brushes secured in a holder adjacent the grinding member. This form of the apparatus is useful for brushes such as hairbrushes which may have bristle ends disposed in an arcuate configuration. In this machine the brush holder also rotates the brushes to ensure that all of the bristles will be equally flexed upon the grinding member.

The apparatus as shown in FIGS. 1–10 is particularly suitable for the grinding of thermoplastic bristles in a toothbrush, although it will be apparent to those familiar with this art that other types of brushes may be treated in the apparatus also. The machine includes a base plate 10 and a shaft 12 extending vertically upwardly through the center of the base plate. The shaft 12 is rotatably mounted and is driven by means of a suitable electric motor 14, mounted below the plate 10, which is coupled by a belt and pulley drive to the gear reduction box 16. Shaft 12 is suitably coupled to the mechanism of box 16 in order to be rotated.

The upper end of shaft 12 supports a rotatable brush carrying wheel 20 which supports the brushes, such as toothbrushes 24–30. These brushes are supported on the underside of wheel 20 near the perimeter thereof so that the bristles travel in a horizontal plane with the bristles extending downwardly and the brush handles extending radially from the brush carrying wheel. Subsequently a detailed description will be given of the brush holders of the wheel 20 and the method of insertion and ejection.

The apparatus also includes three brush grinding assemblies 35, 36 and 37. Assembly 35 is driven by means of motor 40 affixed to the plate 10 and a belt and pulley drive system 41. Assembly 37 is driven by means of a motor 43 also affixed to the plate 10 and a belt and pulley drive 45. The assembly 36 is similarly driven through a pulley drive 46 and a motor (not shown) mounted on the underside of the plate 10. The drive motors 14, 40, 43 and the motor for drive 46 are controlled by switch 47.

The brush grinding assemblies 35–37 are of generally similar construction and include the grinding discs 40, 41 and 42 respectively. These discs have upwardly facing, generally parallel surfaces which include abrasive material to perform the bristle grinding operation.

Figure 3:
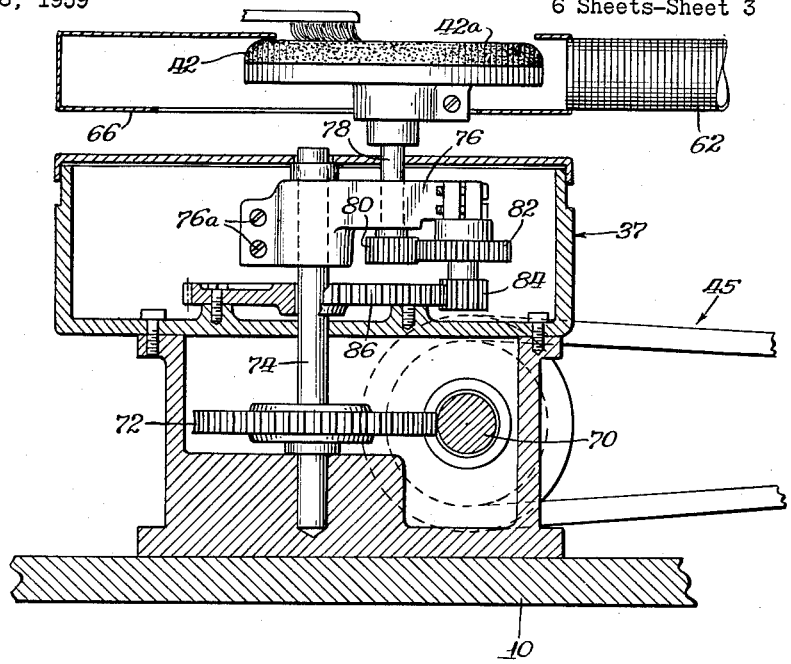
FIG. 3 is a sectional view along the line 3—3 of FIG. 2.
Figure 4A:
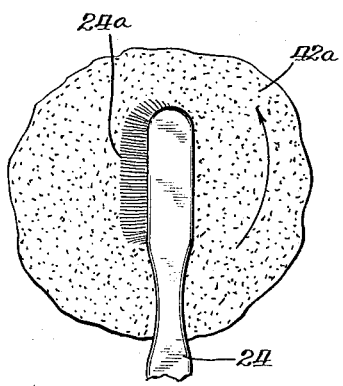

The grinding discs 40–42, all undergo compound motion comprising rotation at a grinding speed and simultaneous movement in an eccentric circular path for proper flection of the brush bristles. Disc 40 is rotated about its own axis in a counter-clockwise direction and is also moved counter-clockwise in a circular path 50. Disc 41 is rotated in a clockwise direction and moved in a clockwise circular path 52, while disc 42 is rotated in a counter-clockwise direction and moved in a counter-clockwise circular path 53. The ducts 60, 61 and 62 terminate respectively adjacent the grinding assemblies 35, 36 and 37, and these may be hooked to suitable vacuum apparatus to remove the dust resulting from the grinding operation. The ducts 60–62 are supported on the underside of the stationary plate 65 which forms a guard over the motors 40 and 43. FIG. 3 shows a guard 66 for disc 42 and this also serves as part of the dust collecting means. Similar guards may be used for the other discs but these are omitted in the other views of the machine for clarity.

As shown in FIGS. 3, 4 and 4–a the brushes are supported above the grinding discs with a spacing less than the bristle length so that the bristles, such as bristles 24–a of the brush 24, are pressed or flexed against the grinding surfaces, such as surface 42–a. Then the grinding disc is rotated at a relatively high speed in order to round or taper the bristle ends and simultaneously the grinding discs are rotated in the above described circular paths at a relatively slow rate so that the bristles will be effectively rolled or moved in circular paths on the grinding surface to present all corners of the bristle ends for tapering and rounding.

As illustrated in FIG. 8, which is reproduced from an actual enlarged photograph of thermoplastic bristles prior to grinding but subsequent to being trimmed to length, the corners are sharp and jagged and in some cases "mushroomed" by the cutting operation. FIG. 9 shows the same bristles, now designated 24–b, after having been passed through the grinding apparatus. It may be noted that the ends are tapered and rounded and that a slight roughening is indicated along each end section due to the contact thereof with the grinding surface.

As shown in FIG. 2, the bristle path as each brush is carried by the wheel 20 is approximately over the center of the circular paths 50, 52 and 53, in which paths the grinding discs are moved. Furthermore, the diameter of the grinding discs 40–42 is such that the bristles remain in contact with the abrasive surfaces for several revolutions in the eccentric paths as the wheel 20 carries the brushes across the central portion of each brush grinding assembly. The top surface of each grinding disc is rounded at the outer rim as shown so that the bristles are not cut by the initial contact with the discs as the bristles move relative to the discs and are passed thereupon.

In a machine of practical construction for the grinding of toothbrush bristles composed of nylon and having an approximate bristle length of $7/16''$, a successfully operable grinding machine rotated the grinding discs 40, 41 and 42 at 360 r.p.m. and moved these discs in their respective circular paths 50, 52 and 53 at 30 *r.p.m.* The brush carrying wheel 20 was operated at a fractional r.p.m. such that the bristles of each brush remained in contact with the different grinding discs for approximately 7 cycles or revolutions in the circular paths 50, 52 and 53. Furthermore, the spacing of the brush backs from the discs was of the order of $9/32$ inch and grade #80 aluminum oxide paper was used on discs 40 and 41. The disc 42 was spaced $13/32''$ from the brush backs. Grade #100 aluminum oxide paper was used on this disc. The discs 40 and 42 thus performed the major part of the grinding and roughening operation and the greater spacing and finer grade of abrasive used on disc 42 resulted in a finishing of the ends and final smoothing thereof to remove any sharpened tips. All of the discs were 7'' in diameter and travelled in paths which were 11'' in diameter.

While each brush will be in contact with each grinding disc for approximately seven cycles of the disc in its eccentric circular path, it should be noted that this contact will be intermittent. That is, when the brush is transported to a position where is just enters the radius of travel of one of the grinding discs, it will be engaged by the disc for only a portion of its path of orbital travel. This occurs because the speed of eccentric rotation of the discs is much greater than that of the brushes as transported by wheel 20. Typically a brush in moving up to the first grinding disc 40 will intermittently engage the disc during two of its revolutions in the eccentric path and then, as the brush is moved closer, it will continuously engage the disc during approximately four of its revolutions in the eccentric path followed by two intermittent engagements between the brush and disc as the brush finally moves out of the range of the disc. When the brush is engaging the disc in the extreme regions of the disc travel in its eccentric path, the disc will in one instance be travelling toward the brush and then will, as it turns, begin travelling away from the brush. It is this movement of the disc wherein it travels toward and away from the brush which effectively rolls the bristles so that all of the circumference of the end of each bristle is eventually brought into engagement with the disc surface in order to be effectively ground thereby due to the grinding rotation imparted to the disc.

The construction of each brush grinding assembly may be similar except that alternate ones are operated in opposite directions. This may most conveniently be accomplished by reversing the direction of the motor or pulley drive for the assembly 36.

FIG. 3 shows a sectional view of the assembly 37 which is representative of the other assemblies also. In assembly 37 a worm gear 70 is driven by the belt and pulley drive 45 and this gear turns a further gear 72. Gear 72 is affixed to a vertical shaft 74 to which is also affixed a carriage member 76 which is rotatable therewith. The shaft 78 is supported by the carriage member 76 and is rotatably supported thereby in parallel alignment with shaft 74. The upper end of shaft 78 carries the grinding disc 42 which is affixed thereto. The lower end of shaft 78 carries a gear 80 which is meshed with a gear 82 rotatably supported by the carriage 76. Gear 82 rotates with gear 84 which engages the stationary gear 86 which is mounted concentrically with the shaft 74.

It may be seen that as shaft 74 is rotated the carriage member 76 will be rotated to move the grinding disc 42 in its circular eccentric path 53. As this is done the gear 84 will be carried about the periphery of fixed gear 86 thus causing gears 84 and 82 to rotate. Gear 80 will thus be driven by gear 82 in order to rotate the shaft 78 and the disc 42. By properly selecting the gear ratios, disc 42 may be rotated about shaft 78 at a relatively high rate in order to effect the grinding of the bristle ends and the movement of the disc 42 in its circular path 53 may be at a relatively slow rate in order to flex the brush bristles so that all sides are ground. The representative rotational rates of the grinding discs previously given may be obtained by rotating worm gear 70 at 1200 r.p.m. and using a 40:1 reduction between gears 70 and 72 in order to eccentrically move disc 42 at 30 r.p.m. Then a 1:6 ratio between gears 84 and 86 and a 1:2 ratio between gears 80 and 82 provides 360 r.p.m. for the rotation of disc 42 about shaft 78. The height of the disc 42 may be changed to accommodate brushes having different bristle lengths by loosening screws 76–a to unclamp the carriage 76. This adjustment would be limited in that the gears 84, 86 must remain engaged.

In operating the apparatus to produce production quantities of brushes, the machine operator would be positioned adjacent the tray 88 (FIG. 1) on the side of the machine opposite the location of the grinding assemblies and would insert the brushes in brush holders carried by the wheel 20. The brushes may then be carried through the grinding operation and automatically ejected by means of the cam 90 (FIG. 5). The wheel 20 includes a series of 120 equally spaced brush holders such as holder 95 spaced all about the rim of wheel 20. FIG. 2 shows some of these holders all of which are the same.

The holder 95 shown in detail in FIGS. 4–6 includes a body member 101 having a channel shaped opening facing outwardly from the wheel 20 and supported on the underside thereof. The opening in member 101 is tapered inwardly and is wide enough to receive a brush back. The rim portions 102 project across the lower section of the opening to support the lower edges of a brush back with the bristles projecting downwardly between the portions 102 as shown in FIG. 6. A pin 104 extends downwardly through a portion of the wheel 20 and member 101 to bear against a brush back, and a spring member 106 supported on the top of wheel 20 is used to bias the pin member 104 in order to secure a brush such as brush 92 in the opening of member 101.

Since there is considerable force exerted on the brush bristles during the grinding operation, the handles are supported by means of guide rails 110, 111 and 112 respectively associated with the grinding assemblies 35, 36 and 37. As shown in FIG. 2 the handles of brushes 29 and 30 ride on a beveled edge of the guide rail 111 which prevents the brushes from being thrown out of the holder as they are ground.

An ejection pin 115 is slidably carried by the member 101 and is aligned with the end of the brush as carried in the holder. This pin is freely slidable with respect to member 101 and is normally held by a brush back in a position projecting from the rear of the member 101 as shown by the position of the ejection pin 116 in FIG. 4. However, as the brush carrying wheel 20 rotates, the ejection pin of each brush holder bears against the cam 90 and is moved radially outwardly to release the brushes held thereby as shown in FIG. 5. Obviously the brushes may be dispensed into a suitable container upon ejection.

In order that the brushes as treated by the machine will be free from grit and foreign matter upon removal at the ejection station, brush cleaning apparatus is also included in the machine. This takes the form of a pair of notched bristle deflectors 120, 121 (FIG. 7) which are mounted on a shaft 123. The shaft 123 is rotatably supported in the journal 124 so that the deflectors 120 and 121 may engage the bristles after they have been ground by the disc 42. A suitable electric motor 126 is coupled to the shaft 123 by belt and pulley drive 128 to operate the deflectors. The deflectors 120 and 121 are partially enclosed in a housing 130, which is coupled to a vacuum tube 132, in order to remove the grinding dust which is loosened by the deflectors. To further assist in cleaning the brushes, a pneumatic tube 134 is positioned to direct an air stream on the brush bristles as they are being struck by the deflectors 120 and 121, thereby insuring that all of the foreign matter on the bristles will be dislodged.

The above described brush bristle grinding apparatus is particularly suited for the treatment of brushes having bristles, the ends of which are all substantially co-planar, or approximately of the same length as extending from the flat brush back. However, there are certain types of brushes having bristle ends which form a markedly curved or rounded configuration and these would preferably be treated in apparatus as shown in FIGS. 10–16. FIG. 16 shows a hairbrush 150 having bristles extending radially outwardly from the brush back so that there is an arcuate pattern to the overall bristle arrangement when the brush is viewed in cross section. It should be obvious that the previously described machine would not produce uniform treatment of the ends of the bristles of the brush 150.

The machine in FIGS. 10 and 11 includes a table 155 upon which supports two rails 157 and 158. A support plate 160 is slidably mounted on the rails 157, 158, by means of the encircling brackets 162, 163, etc. A support roller 165 is also secured to the plate 160 and this runs on the table 155 in order to relieve some of the friction upon the rails 157, 158.

The table 155 is slotted to receive a bracket arm 167 which extends below the table and is joined to a reciprocating drive rod 170 for moving the plate 160 back and forth along the guide rails 157, 158. As will be explained subsequently the drive rod 170 is pneumatically driven and the drive apparatus is electrically reversible at the ends of the travel of plate 160, namely when bracket 163 engages reversing switch 172 or when bracket 162 engages reversing switch 173.

A brush grinding assembly 180 is mounted upon the plate 160 and this assembly is driven by the electric motor 182 also carried upon the plate 160. This motor is mechanically coupled to the assembly 180 by means of the pulley and belt drive 184. The assembly 180 includes a grinding disc 185 having an abrasive surface 185–a and this disc is rotated about its axis at a bristle grinding speed, while at the same time it is moved in an eccentric circular path 187. The overall motion of the disc 185 corresponds with the compound motion of disc 42 previously described in detail for the machine of FIG. 1. Accordingly it will be understood that the assembly 180 includes the apparatus shown in the sectional view of FIG. 3, illustrating the structure of the assembly 37.

In order to support the brushes the bristles of which are to be ground by disc 185, bridge supports 190 and 192 are secured to the table 155 in positions to straddle the reciprocating bristle grinding assembly 180. The bridge structures 190, 192 are joined to the support members 193 and 194 which run parallel to the reciprocal movement of the assembly 180. These support members rotatably carry the brush holding assemblies 200, 201 and 202. The assemblies 200–202 are affixed to respective gears 205, 206 and 207 in order to be rotatable therewith. A gear rack 210 is slidably retained by the bridge supports 190 and 192 and this rack is meshed with the gears 205–207 so that slidable movement thereof will cause rotation of the brush holding assemblies 200–202.

The rack 210 is coupled to a reciprocating drive rod 212 which is pneumatically operated and electrically reversed in order to drive the brush holding assemblies 200–202 repeatedly back and forth through limited respective arcs. The drive rod 212 carries the switch actuator 214 which engages switches 216 and 217 in order to electrically reverse the drive mechanism.

The switches 216 and 217 are coupled to the electric timer 220 which is also connected to the electric pneumatic valve 222. Timer 220 includes the necessary electrical connections to a source of operating power for valve 222. A supply of compressed air is coupled to the valve 222 and this valve is joined to fittings at opposite ends of pneumatic cylinder 225. This cylinder includes a piston for driving the rod 212 which will be reciprocally driven as the switches 216 and 217 are operated to reverse the air supply to opposite ends of the cylinder 225 through operation of the valve 222.

The cylinder 230 operates in a similar manner to drive the rod 170. The switches 172 and 173 are coupled to the electric timer 220 which also supplies power to the electric valve 232 for operation by the switches. The valve 232 is coupled to a supply of compressed air and to opposite ends of the cylinder 230 so that the piston of this cylinder is reciprocally driven to operate the rod 170 as the switches 172 and 173 are alternately operated by the movement of the table 160.

The electric timer 220 is used to control the power to both valves 222 and 232, as well as the electric motor 182 so that there will be a predetermined number of passes of the brush grinding assembly 180 and a predetermined number of partial rotations of the brushes carried by the assemblies 202–202, after which the mechanism will automatically stop. At such time, of course, an operator would remove the brushes from the holding assemblies and replace them with additional brushes to be treated, and the machine would again be started by restarting the timer 220.

The brushes are retained in the brush holding assemblies 200–202 as shown more particularly in FIGS. 12, 14 and 15. The holding assemblies are the same and assembly 201 includes a removable member 240 which is secured to the gear end of the body of holding assembly 201 in a position spaced from that body to form a ledge to receive one end of a brush back. The other end of the brush, namely its handle, is received in a notch 245 in the pivotally mounted release lever 247. This lever is pivotally mounted in the body of the holding assembly 201 by means of a pin 248 and it is spring biased to urge the notch 245 toward the member 240 and grasp a brush such as brush 250, shown supported in the holding assembly 202. The spring 252 is mounted on a bracket and stud 254 and engages the handle end of the lever 247 in order to removably secure a brush. A stop plate 255 is included so that movement of lever 247 by the spring 252 will be limited.

The grinding disc 185 rotates about its own axis at a grinding speed, while at the same time it is moved in an eccentric path in order to effectively roll the ends of the brush bristles so that all portions of the circumferences thereof are ground. Simultaneously, of course, the brushes are rotated through an arc to bring all of the bristle ends into engagement with the grinding disc. Obviously the length of this arc will depend upon the extent of the curved outline of the bristle ends of the brush such as shown in FIG. 16. The placement of switches 217 and 216 may be varied to change the extent of this arc for different brush forms. In a machine of practical construction the disc 185 was rotated at 360 r.p.m. and was moved in an eccentric circular path 187 at 30 r.p.m. The brushes, such as brush 250, were turned through an arc of 90° at a rate of forty-two complete reciprocations per minute. The bristle grinding assembly 180 was completely reciprocated five times under the brushes supported in the holding assemblies and was then disabled, or de-energized, by the electric timer 220 preparatory to removal of the brushes.

It should be noted that brushes having different bristle lengths can be accommodated in the machine since the height of the entire brush supporting means and the reciprocating drive therefor can be varied by means of the screws 270 supporting cross members of the bridge structures 190 and 192 by means of the slots in the upright members of these bridge structures.

The above described apparatus therefore provides a means and a method of tapering and rounding the ends of brush bristles to remove the sharp corners and mushroomed configuration often found on thermoplastic bristles. Furthermore, when the bristles are treated in accordance with the invention, the end sections thereof are rendered less smooth and glossy so that the bristles better retain a paste, powder or liquid which is to be applied by the brush. Such roughening of the bristle end sections also tends to improve the stimulating action of the brush upon the skin of a user of a personal brush, such as a hairbrush or toothbrush. It should further be clear that the apparatus of the invention is capable of economically treating relatively large production quantities of brushes to provide the improved end configuration and condition.

I claim:

1. A machine for rounding and tapering the ends of bristles of a brush, including in combination, a grinding disc having a flat abrasive surface, first means for supporting said grinding disc rotatably about a first axis transverse to said abrasive surface, second means for supporting said first means rotatably about a second axis parallel to and spaced from the first axis, mechanical drive means for simultaneously rotating said first means about the second axis at a relatively slow rate and rotating said grinding disc about the first axis with a relatively fast grinding rotation, and means aligned substantially with the center of the path of said first means about the second axis for transporting a brush across the entire path of rotation of said disc about the second axis with the ends of the bristles thereof flexed on said flat abrasive surface in non-alignment with the first axis and at a rate to engage the bristles and said disc during a plurality of rotations of said first means so that the bristles are effectively rolled upon said grinding disc to present the entire circumference of the end of each bristle to said grinding disc to be rounded and tapered thereby due to the grinding rotations thereof.

2. In a brush grinding machine, the combination of a plurality of rotatable drive means including a plurality of substantially parallel rotatable shafts and means for moving said shafts in respective circular paths transverse with respect to the axes of said shafts, a plurality of disc members one carried by each of said rotatable shafts to be both rotated and moved in the circular paths, said disc members having respective flat substantially parallel abrasive surfaces and rounded peripheral edges, continuous conveyor means for supporting a plurality of brushes at substantially fixed spacings from said abrasive surfaces with the bristles thereof passing upon said abrasive surfaces over said rounded edges to be flexed against such surfaces, and means for driving said conveyor means for moving the brush bristles sequentially into engagement with said abrasive surfaces and across the entire respective circular paths of rotation of said disc members during a plurality of movements of said disc members in the respective circular paths thereof.

3. In a brush grinding machine, the combination of at least a pair of rotatable drive means including a pair of substantially parallel rotatable shafts and means for moving said shafts in respective circular paths transverse with respect to the axes of said shafts and at a fractional rotational rate of the rates of rotation of said rotatable shafts, first and second disc members one carried respectively by said rotatable shafts to be both rotated and moved in the circular paths, said first and second disc members having respective coarse and fine parallel abrasive surfaces, continuous conveyor means aligned substantially with the centers of the circular paths for supporting a plurality of brushes at substantially fixed spacings from said abrasive surfaces with the bristles thereof flexed against such surfaces as a result of said substantially fixed spacings, and means for driving said conveyor means for moving the brushes and the bristles thereof sequentially into engagement with said abrasive surfaces during a plurality of movements of said disc members in the respective circular paths thereof, said second disc member being spaced farther from the brushes in said conveyor means than said first disc member so that the degree of flexing of the bristles on said disc members differs and said first disc member grinds and roughens the complete circumferences of end sections of brush bristles and said second disc member grinds and roughens the complete circumferences of lesser end sections of the bristles.

4. In a brush grinding machine, the combination of a plurality of rotatable drive means including a plurality of substantially parallel rotatable shafts and means for moving said shafts in respective circular paths transverse with respect to the axes of said shafts, a disc member carried by each rotatable shaft and having respective substantially parallel abrasive surfaces including a first relatively coarse surface on one disc member and a second relatively fine surface on another disc member, means aligned substantially with the centers of the circular paths for supporting a plurality of brushes and sequentially engaging the bristles thereof with said first surface and said second surface, the spacing from said abrasive surfaces to the bristles being such that the bristles are flexed against such surfaces during a plurality of movements of each disc member in its circular path, and bristle deflecting means for dislodging foreign matter from the bristles subsequent to engagement thereof with said abrasive surfaces.

5. A machine for grinding the ends of bristles of a brush, including in combination; a grinding assembly having a substantially flat abrasive member, first means for supporting said abrasive member rotatably about a first axis, second means for supporting said first means rotatably about a second axis parallel to and spaced from the first axis, mechanical drive means for simultaneously rotating said first means about the second axis and said abrasive member about the first axis; support means for holding a brush with the ends of the bristles thereof flexed upon said abrasive member in non-alignment with the first axis during a plurality of rotations of said abrasive member and said first means; and means for reciprocally displacing said support means relative to said grinding assembly in a direction substantially parallel to said flat abrasive member for repeatedly engaging the bristles and said abrasive member.

6. A machine for grinding the ends of bristles of a brush, including in combination; a grinding assembly having an abrasive member, first means for supporting said abrasive member rotatably about a first axis, second means for supporting said first means rotatably about a second axis parallel to and spaced from the first axis, mechanical drive means for simultaneously rotating said first means about the second axis and said abrasive member about the first axis; means for reciprocating said grinding assembly in a direction transverse to said axes; and support means for holding a brush with the ends of the bristles thereof flexed upon said abrasive member during a plurality of rotations of said abrasive member and said first means and a plurality of reciprocations of said grinding assembly.

7. A machine for grinding the ends of bristles of a brush, which bristle ends form an arcuate pattern, including in combination; a grinding assembly having an abrasive member, first means for supporting said abrasive member rotatably about a first axis, second means for supporting said first means rotatably about a second axis parallel to and spaced from the first axis, mechanical drive means for simultaneously rotating said first means about the second axis and said abrasive member about the first axis; means for reciprocating said grinding assembly; brush holding means for removably retaining a brush with the ends of the bristles thereof flexed upon said abrasive member; and means for rotating said brush holding means for uniformly presenting all of the bristle ends to said abrasive surface to be ground and roughened thereby during a plurality of rotations of said abrasive member and said first means and a plurality of reciprocations of said grinding assembly.

8. A machine for grinding the ends of bristles of a brush, which bristle ends form a non-planar pattern, including in combination; a grinding assembly having an abrasive member, first means for supporting said abrasive member rotatably about a first axis, second means for supporting said first means rotatably about a second axis parallel to and spaced from the first axis for eccentrically moving said abrasive member, mechanical drive means for simultaneously rotating said first means about the second axis and said abrasive member about the first axis; means for slidably mounting said grinding assembly so that said abrasive member is reciprocally movable along a prescribed path; variable support means for removably holding a brush with the ends of the bristles thereof flexed upon said abrasive member to be rolled thereby upon eccentric movement of said abrasive member, said support means being reciprocally rotatable to rotate a brush transverse to the prescribed path so that all of the bristle ends are uniformly flexed upon said abrasive member; mechanical means for reciprocating said grinding assembly and reciprocally rotating said support means; and timer means for controlling said mechanical means and disabling the same after a predetermined number of reciprocations of said grinding assembly and said support means for rounding and roughening the bristle ends during a plurality of rotations of said abrasive member and said first means.

9. A method of rounding and roughening the end sections of brush bristles mounted so that the ends thereof are in an arcuate pattern, said method including the steps of rotating a grinding surface, moving said grinding surface in a given path eccentric to the axis of rotation thereof, effecting relative movement between the brush and said grinding surface including rotation of the brush to place the bristles thereof in the given path of movement of said grinding surface while maintaining the brush bristles flexed upon said grinding surface, whereby the bristles are effectively rolled by movement of said grinding surface in the given path to present the entire circumferences of the ends of the bristles to the grinding surface.

10. A method of rounding and roughening the end sections of brush bristles including the steps of rotating each of a plurality of substantially flat grinding surfaces, moving said grinding surfaces in opposing circular paths eccentric to the axes of rotation thereof, transporting a plurality of brushes across the centers of the circular paths of movement of said grinding surfaces and flexing the brush bristles sequentially upon said grinding surfaces so that the bristles are effectively rolled to present the entire circumferences of the ends thereof to said grinding surfaces.

11. A machine for rounding and tapering the ends of bristles of a brush, including in combination, a grinding disc having a portion with a substantially flat abrasive surface, first means for supporting said disc rotatably about a first axis transverse to said surface, second means for supporting said first means rotatably about a second axis parallel to and spaced from the first axis, mechanical drive means for simultaneously rotating said grinding disc about the first axis with a relatively fast grinding rotation and for rotating said first means about the second axis at a relatively slow rate so that said abrasive surface moves about the second axis in a given path, rotatable brush holding means for transporting a brush across the given path, said brush holding means being spaced from said abrasive surface less than the length of the brush bristles so that the ends of the bristles are flexed upon said abrasive surface, and means for driving said brush holding means at a rate with respect to the slow rate to intermittently engage the brush bristles and said abrasive surface during a plurality of rotations of said disc in the given path so that the brush bristles are effectively rolled upon said abrasive surface to present the entire circumferences of the bristles to such surface to be rounded and tapered in response to the grinding rotation thereof.

12. A method of rounding and roughening the end sections of brush bristles, including the steps of rotating a grinding surface, moving said grinding surface in a circular path eccentric to and transverse to the axis of rotation thereof, transporting a brush across the circular path with a spacing between the brush and said grinding surface to flex the brush bristles on said grinding surface and transporting the brush at a rate with respect to the rate of movement of said grinding surface in the circular path to engage the bristles and said surface for a plurality of movements of said surface in the circular path so that the entire circumferences of the ends of the bristles are presented to said grinding surface during rotation thereof.

13. A method of rounding and roughening the end sections of brush bristles including the steps of rotating a plurality of grinding surfaces having sloping sides, moving said grinding surfaces in respective circular paths eccentric to and perpendicular to the axes of rotation thereof, transporting a brush across the circular paths with a spacing between the brush and said grinding surfaces so that the brush bristles pass over the sloping sides of said grinding surfaces and become flexed upon said surfaces and transporting the brush at a rate with respect to the rate of movement of said grinding surfaces in the circular paths to engage the bristles and said surfaces at least intermittently for a plurality of movements of said surfaces in the circular paths so that the entire circumferences of the ends of the bristles are presented to said grinding surfaces during rotation thereof.

References Cited in the file of this patent

UNITED STATES PATENTS

| | | |
|---|---|---|
| 1,972,086 | Buckley | Sept, 4, 1934 |
| 2,227,126 | Cooke | Dec. 31, 1940 |
| 2,374,415 | Cave et al. | Apr. 24, 1945 |
| 2,700,259 | Dreyfus | Jan. 25, 1955 |
| 2,770,079 | Baumgartner | Nov. 13, 1956 |